United States Patent
Havdala et al.

(10) Patent No.: US 12,223,062 B1
(45) Date of Patent: Feb. 11, 2025

(54) TECHNIQUES FOR IDENTIFYING GAPS IN SECURITY CONTROLS

(71) Applicant: Zafran Security LTD, Tel Aviv (IL)

(72) Inventors: Snir Havdala, Tel Aviv (IL); Ben Seri, Ramat Gan (IL)

(73) Assignee: Zafran Security LTD, Tel Aviv (IL)

( * ) Notice: Subject to any disclaimer, the term of this patent is extended or adjusted under 35 U.S.C. 154(b) by 0 days.

(21) Appl. No.: 18/649,484

(22) Filed: Apr. 29, 2024

Related U.S. Application Data

(60) Provisional application No. 63/570,547, filed on Mar. 27, 2024.

(51) Int. Cl.
G06F 21/57 (2013.01)

(52) U.S. Cl.
CPC ...... *G06F 21/577* (2013.01); *G06F 2221/034* (2013.01)

(58) Field of Classification Search
None
See application file for complete search history.

(56) References Cited

U.S. PATENT DOCUMENTS

| | | |
|---|---|---|
| 8,468,244 B2 | 6/2013 | Redlich et al. |
| 9,697,355 B1 | 7/2017 | Park et al. |
| 9,807,109 B2 | 10/2017 | Laidlaw et al. |
| 10,250,619 B1 | 4/2019 | Park et al. |
| 10,339,321 B2 | 7/2019 | Tedeschi |
| 11,184,401 B2 | 11/2021 | Crabtree et al. |
| 11,297,109 B2 | 4/2022 | Crabtree et al. |
| 11,316,875 B2 | 4/2022 | Frey et al. |
| 11,902,322 B2 | 2/2024 | Hutchinson et al. |
| 2008/0282320 A1 | 11/2008 | DeNovo et al. |
| 2019/0025805 A1 | 1/2019 | Cella et al. |
| 2019/0025812 A1 | 1/2019 | Cella et al. |
| 2019/0034639 A1 * | 1/2019 | Sloan ............... G06F 16/285 |
| 2019/0207981 A1 * | 7/2019 | Sweeney ........... H04L 41/145 |
| 2020/0005633 A1 | 1/2020 | Jin et al. |
| 2020/0389495 A1 | 12/2020 | Crabtree et al. |

(Continued)

OTHER PUBLICATIONS

Andrew et al., "Knowledge Graphs for Cybersecurity: A Framework for Honeypot Data Analysis," 2023 IEEE International Conference on Cryptography, Informatics, and Cybersecurity (ICoCICs) Year: 2023 | Conference Paper | Publisher: IEEE.

(Continued)

*Primary Examiner* — Fatoumata Traore
(74) *Attorney, Agent, or Firm* — M&B IP Analysts, LLC

(57) ABSTRACT

A system and method for identifying security control gaps. A method includes integrating with a set of security controls deployed with respect to a computing environment, wherein integrating with the set of security controls further comprises deploying an artifact in the computing environment, wherein the artifact is configured to record a plurality of activities performed in the computing environment by the set of controls; identifying at least one computing asset to be protected by the set of security controls; identifying at least one security control gap in the computing environment based on a configuration of the set of security controls, wherein each security control gap is defined with respect to one of the identified at least one computing asset; and performing at least one remediation action with respect to the identified at least one security control gap.

21 Claims, 8 Drawing Sheets

(56) References Cited

U.S. PATENT DOCUMENTS

| | | |
|---|---|---|
| 2020/0412767 A1 | 12/2020 | Crabtree et al. |
| 2021/0026960 A1 | 1/2021 | Martin et al. |
| 2021/0029029 A1 | 1/2021 | Mehmedagic et al. |
| 2021/0075626 A1* | 3/2021 | Ilany .................... G06F 11/302 |
| 2021/0234885 A1 | 7/2021 | Campbell |
| 2021/0336992 A1* | 10/2021 | Shivanna ................ H04L 63/20 |
| 2022/0078210 A1 | 3/2022 | Crabtree et al. |
| 2022/0103577 A1 | 3/2022 | Shah et al. |
| 2022/0366045 A1 | 11/2022 | Summers et al. |
| 2023/0262073 A1 | 8/2023 | Sheu et al. |
| 2023/0328075 A1 | 10/2023 | Almasan et al. |
| 2023/0370439 A1 | 11/2023 | Crabtree et al. |
| 2023/0388320 A1 | 11/2023 | Lu et al. |
| 2024/0305664 A1 | 9/2024 | McCarthy et al. |

OTHER PUBLICATIONS

Zakaria et al., "Feature Extraction and Selection Method of Cyber-Attack and Thread Profiling in Cybersecurity Audit," 2019 International Conference on Cybersecurity (ICoCSec) Year: 2019 | Conference Paper | Publisher: IEEE.

* cited by examiner

Control Gap Findings

All 37    ABC (21)    XYZ Group12    LMN  4

| Type ▼ Filtered ● | Control | Description | Affected | Internet Facing | Severity ↓ |
|---|---|---|---|---|---|
| Antivirus/Antimalware (MO949) EDR Coverage Gap | ABC | ABC agent does not exist on Internet-facing asset with high severity vulnerabilities | i-0abc12345de... | 🌐 | ●●●○ Hig |
| Antivirus/Antimalware (MO949) EDR Coverage | ABC | ABC agent does not exist on Internet-facing asset with high severity vulnerabilities | i-0xyz67890gh... | 🌐 | ●●●○ Hig |
| Antivirus/Antimalware (MO949) EDR Coverage Gap | ABC | ABC agent does not exist on Internet-facing asset with high severity vulnerabilities | i-0def23456jk... | 🌐 | ●●●○ Hig |
| Antivirus/Antimalware (MO949) EDR Coverage | ABC | ABC agent does not exist on an asset with high severity vulnerabilities | i-0tv1bc2d123... | 🌐 | ●●●○ Hig |

← Previous    One    Next →

FIG. 6

TECHNIQUES FOR IDENTIFYING GAPS IN SECURITY CONTROLS

CROSS-REFERENCE TO RELATED APPLICATIONS

This application claims the benefit of U.S. Provisional Patent Application No. 63/570,547 filed on Mar. 27, 2024, the contents of which are hereby incorporated by reference.

TECHNICAL FIELD

The present disclosure relates generally to securing computing environments using security controls, and more specifically to identifying gaps in security controls.

BACKGROUND

As organizations providing and utilizing computing services grow, so do their cybersecurity needs. In particular, increased use of computing resources can result in exponentially more cybersecurity issues in daily operations. As a result, the number of indicators of cyber threats such as security policy violations and anomalies which might need mitigation can become unwieldy.

Failure to address potential cyber threats can allow those threats to succeed, thereby causing significant harm in forms such as downtime, stolen data, improper access to services, and the like. Thus, solutions which aid in maximizing the number of cyber threats that can be mitigated are desirable.

To address potential cyber threats, organizations may use cybersecurity tools in the form of security controls. These security controls may be configured to detect potential threats, to perform actions to remediate potential threats, or both. Breaches or other cybersecurity events may occur when security controls fail to protect certain assets.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for identifying security control gaps. The method comprises: integrating with a set of security controls deployed with respect to a computing environment, wherein integrating with the set of security controls further comprises deploying an artifact in the computing environment, wherein the artifact is configured to record a plurality of activities performed in the computing environment by the set of controls; identifying at least one computing asset to be protected by the set of security controls; identifying at least one security control gap in the computing environment based on a configuration of the set of security controls, wherein each security control gap is defined with respect to one of the identified at least one computing asset; and performing at least one remediation action with respect to the identified at least one security control gap.

Certain embodiments disclosed herein also include a non-transitory computer readable medium having stored thereon causing a processing circuitry to execute a process, the process comprising: integrating with a set of security controls deployed with respect to a computing environment, wherein integrating with the set of security controls further comprises deploying an artifact in the computing environment, wherein the artifact is configured to record a plurality of activities performed in the computing environment by the set of controls; identifying at least one computing asset to be protected by the set of security controls; identifying at least one security control gap in the computing environment based on a configuration of the set of security controls, wherein each security control gap is defined with respect to one of the identified at least one computing asset; and performing at least one remediation action with respect to the identified at least one security control gap.

Certain embodiments disclosed herein also include a system for identifying security control gaps. The system comprises: a processing circuitry; and a memory, the memory containing instructions that, when executed by the processing circuitry, configure the system to: integrate with a set of security controls deployed with respect to a computing environment, wherein integrating with the set of security controls further comprises deploying an artifact in the computing environment, wherein the artifact is configured to record a plurality of activities performed in the computing environment by the set of controls; identify at least one computing asset to be protected by the set of security controls; identify at least one security control gap in the computing environment based on a configuration of the set of security controls, wherein each security control gap is defined with respect to one of the identified at least one computing asset; and perform at least one remediation action with respect to the identified at least one security control gap.

Certain embodiments disclosed herein include the method, non-transitory computer readable medium, or system noted above, further including or being configured to perform the following step or steps: correlating between sets of asset-identifying data generated by the set of security controls; deduplicating a plurality of asset instances represented in the asset-identifying data generated by the set of security controls deployed with respect to the computing environment, wherein deduplicating the plurality of asset instances includes uniquely identifying each of the plurality of asset instances as corresponding to a respective protected computing asset of the at least one computing asset based on the correlation between the sets of asset-identifying data generated by the set of security controls, wherein the at least one security control gap is identified based further on the deduplicated instances of the asset-identifying data.

Certain embodiments disclosed herein include the method, non-transitory computer readable medium, or system noted above, further including or being configured to perform the following step or steps: enforcing at least one policy requiring code releases in the computing environment to be signed using an instance of the artifact.

Certain embodiments disclosed herein include the method, non-transitory computer readable medium, or system noted above, further including or being configured to perform the following step or steps: determining a set of control deployments for the set of controls based on the plurality of activities recorded by the artifact, wherein the at least one security control gap is determined based further on the set of control deployments.

Certain embodiments disclosed herein include the method, non-transitory computer readable medium, or system noted above, further including or being configured to perform the following step or steps: mapping a plurality of capabilities of security controls among the set of security controls to respective cyber threats, wherein the at least one security control gap is identified based further on the mapping.

Certain embodiments disclosed herein include the method, non-transitory computer readable medium, or system noted above, wherein the set of security controls is a set of first security controls, further including or being configured to perform the following step or steps: determining at least one path of exploitation, wherein each path of exploitation is a path of communication between one of the at least one computing asset and at least one computing component, wherein the at least one security control gap includes a lack of a second security control at a deployment location defined with respect to the at least one path of exploitation.

Certain embodiments disclosed herein include the method, non-transitory computer readable medium, or system noted above, further including or being configured to perform the following step or steps: determining, for each security control of the set of security controls, a corresponding set of predetermined features to be used by the security control; and determining whether each security control of the set of security controls is configured to utilize each feature of the corresponding set of predetermined features, wherein the at least one security control gap includes a first security control of the set of security controls lacking configuration to perform at least one feature of the corresponding set of predetermined features.

Certain embodiments disclosed herein include the method, non-transitory computer readable medium, or system noted above, further including or being configured to perform the following step or steps: analyzing a pair of security controls from among the set of security controls, the pair of security controls including a first security control and a second security control of the set of security controls, wherein at least one first security control policy is applied to the first security control, wherein at least one second security control policy is applied to the second security control, wherein analyzing the pair of security controls further comprises analyzing the at least one first security control policy and the at least one second security control policy based on a set of predetermined security control policy conflicts; identifying at least one conflict between the at least one first security control policy and the at least one second security control policy based on the analysis, wherein the at least one security control gap includes the identified at least one conflict between the at least one first security control policy and the at least one second security control policy.

Certain embodiments disclosed herein include the method, non-transitory computer readable medium, or system noted above, further including or being configured to perform the following step or steps: determining, for each security control of the set of security controls, a corresponding set of predetermined software components to be used by the security control; and determining that a first security control of the set of security controls lacks at least one first software component of the set of predetermined software components for the first security control, wherein at least one security control gap includes the lack of the at least one first software component by the first security control.

Certain embodiments disclosed herein include the method, non-transitory computer readable medium, or system noted above, wherein performing the at least one remediation action includes reconfiguring at least one security control of the set of security controls.

Certain embodiments disclosed herein include the method, non-transitory computer readable medium, or system noted above, wherein the set of security controls is a set of first security controls, wherein performing the at least one remediation action includes deploying at least one second security control based on the identified at least one security control gap.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 is an illustration of an example output of control gap findings.

DETAILED DESCRIPTION

Figure 1A:
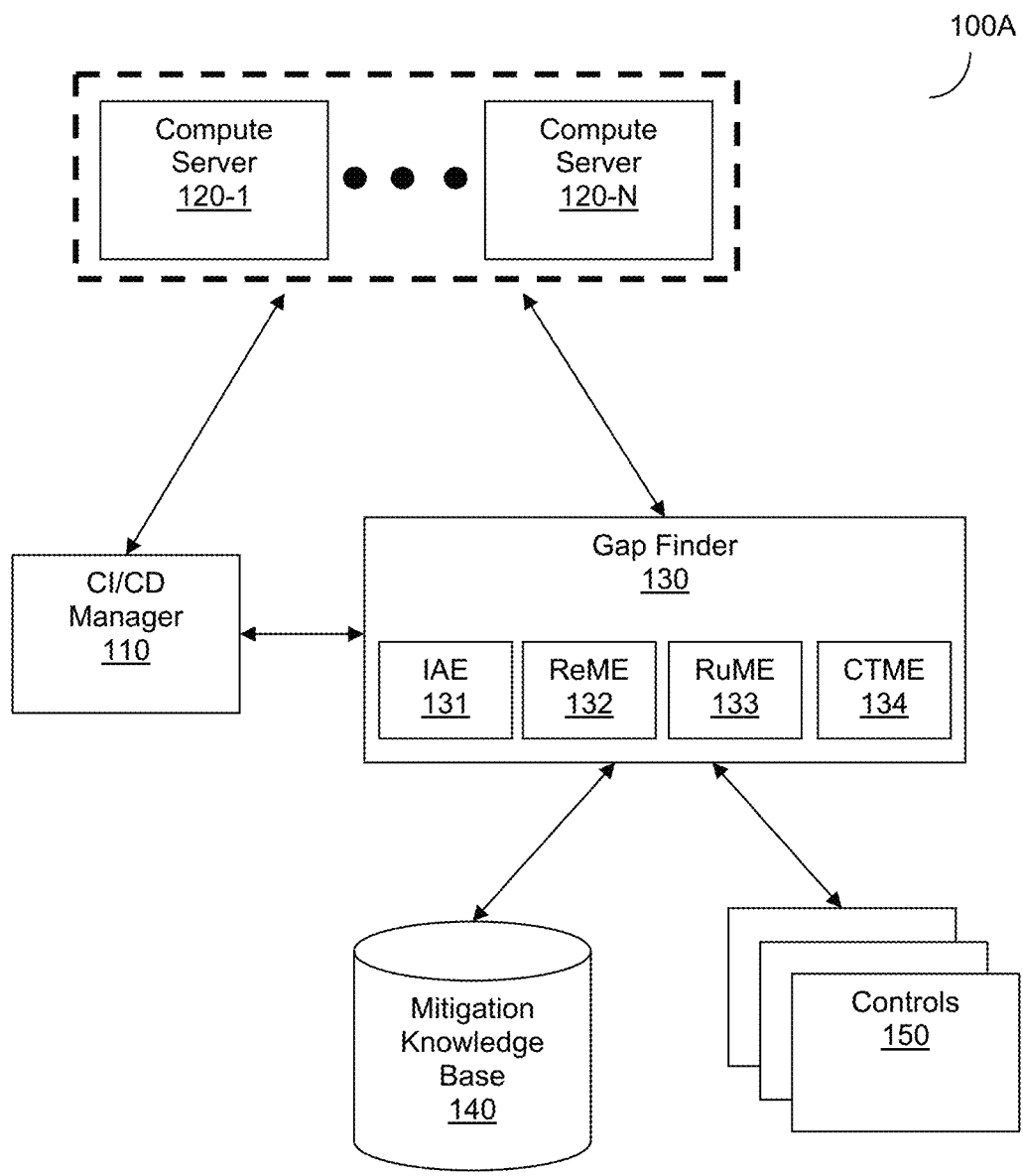
FIGS. 1A-B are network diagrams utilized to describe various disclosed embodiments.

The various disclosed embodiments include techniques for identifying gaps in security controls (also referred to as "controls") as well as techniques which utilize identified control gaps in order to secure computing environments. The security control gaps (also referred to as "control gaps") may be or may include a gap in security defined with respect to a computing asset (also referred to as "asset") protected by one or more controls and, in particular, a gap in configuration, deployment, or both, of the controls with respect to the asset which may cause the controls to fail to adequately protect the asset.

Specifically, the various disclosed embodiments include techniques for identifying security gaps related to controls, for example, gaps defined with respect to coverage, capabilities, conflicting control policies, and missing software components such as plugins. Once security gaps have been identified, appropriate remediation actions may be performed in order to bridge the gaps and secure a computing environment in which the controls operate.

Each control is a cybersecurity tool such as a process or other computing component configured to detect vulnerabilities, to mitigate vulnerabilities, or both. In an embodiment, paths of exploitation for computing assets are determined with respect to controls. The determined paths of exploitation may be utilized to aid in identifying control gaps, for example, by identifying potential deployment locations where controls are not currently deployed or by identifying controls protecting assets whose configuration presents gaps in security for their respective protected assets. In other words, the paths of exploitation may be utilized to identify gaps in protection due to lack of properly configured controls deployed between the asset and potential source locations of cyber threats.

To support the control gap identification, some processes include techniques for deduplicating computing assets (also referred to as "assets"). Specifically, asset deduplication may be performed with respect to asset-identifying data from controls and may include enriching and correlating the asset-identifying data in order to uniquely identify assets between lists, i.e., such that each portion of asset-identifying data from controls may be determined as corresponding to one asset and not to other assets. Uniquely identifying assets in this manner may be utilized to, for example, determine control gaps. For example, by uniquely identifying a specific asset among data from two different controls which collectively provide all security features required to protect a given asset, it may be determined that there is no control gap for that asset.

In this regard, it is noted that a high amount of data may be produced by various controls in computing environments, and that differences among representations of assets in data output by different controls may hinder efforts to secure computing environments. Efforts to secure computing environments may be split between security engineers or architects who plan out security configurations and deployments, and Information Technology (IT) personnel which actually implement security policies and actions. Differences in asset identifiers between controls may compound miscommunications between these different teams. Deduplicating assets as described herein may therefore allow for unifying efforts by different teams as well as enable at least some automated remediation actions.

Various disclosed embodiments may further leverage mapping between discrete capabilities of controls and respective cyber-attacks or portions thereof (e.g., cyber-attack patterns) in order to support any or all of asset identification and deduplication, to determine remediation actions for different control gaps, both, and the like. To this end, some embodiments include techniques for mapping control features to attack patterns.

The control features may include features used for control operations including detecting potential cyber threats, mitigating potential cyber threats, both, and the like.

In addition to aiding with automated remediation of present cyber threats, uniquely identifying assets may aid in performing research in order to subvert future cyber threats. That is, by uniquely identifying assets across different sets of control data, remediation actions performed in order to bridge gaps in control security may be analyzed with respect to results of those remediation actions (e.g., results related to how effectively the remediation actions were in mitigating or avoiding cyber threats). This analysis, in turn, may be used to enable identifying playbooks in the form of combinations of remediation actions performed with respect to controls which are most effective for dealing with different kinds of cyber threats.

Figure 1B:
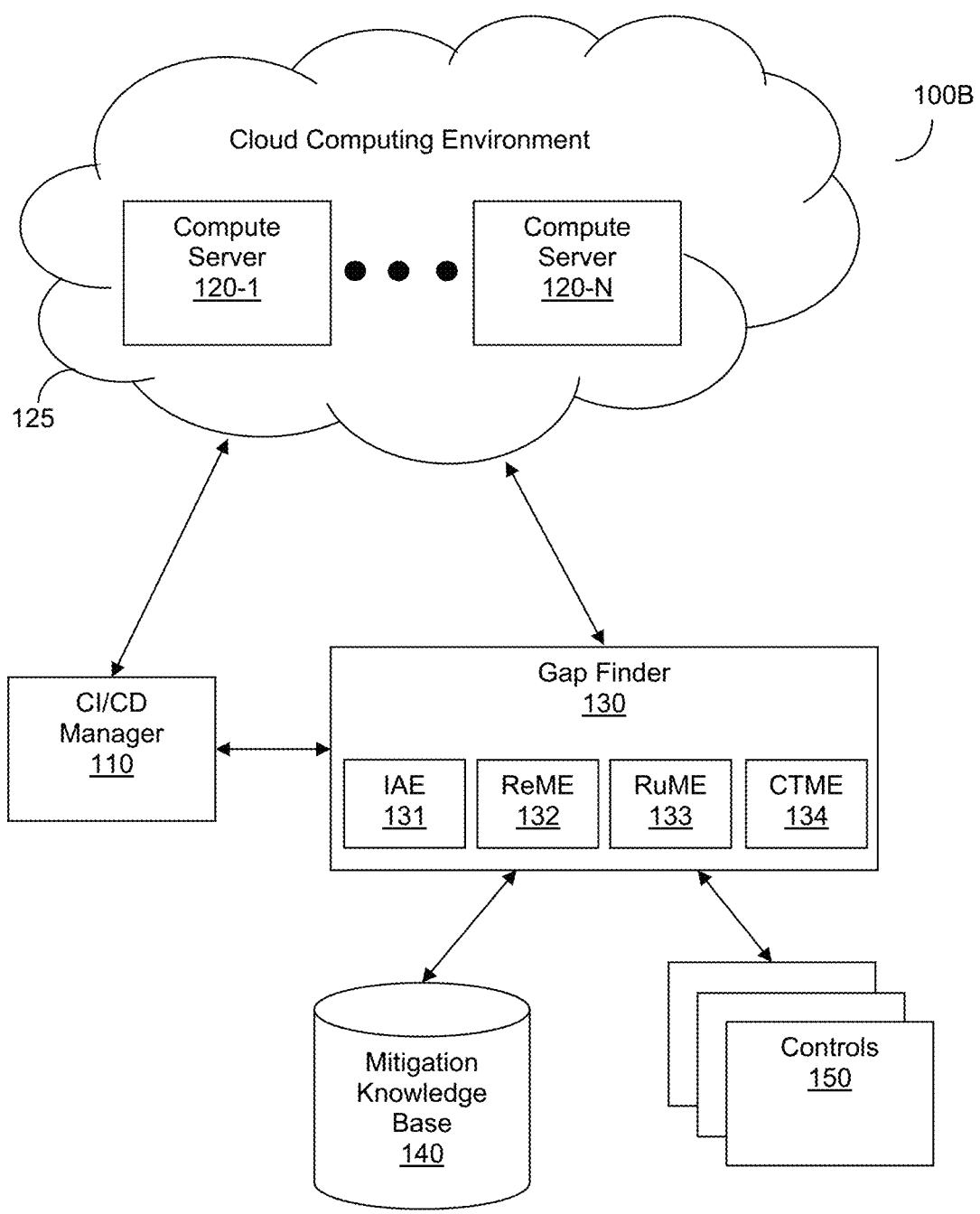

FIGS. 1A and 1B are example network diagrams 100A and 100B, respectively, utilized to describe various disclosed embodiments.

The network diagram 100A depicts an on-premises implementation in which a gap finder 130 is deployed on-premises with one or more compute servers 120-1 through 120-N (where N is an integer having a value equal to or greater than 1). As shown in the diagram 100A, the gap finder 130 communicates with a continuous integration/continuous development (CI/CD) manager 110, the compute servers 120, a mitigation knowledge base 140, and one or more detection tools 150.

The CI/CD manager 110 is configured to manage software components, hardware components, process components, and other parts of a computing infrastructure (not separately depicted) realized at least partially using the compute servers 120. To this end, the CI/CD manager 110 may be configured to deploy code uploaded by one or more developers (not shown), to enforce policies for the computing infrastructure (e.g., on the compute servers 120, both, and the like. When policies requiring signing code with artifacts are utilized as described herein, the CI/CD manager 110 may be configured to enforce such policies.

The compute servers 120 are configured to run processes and perform other activities pursuant to operation of the computing infrastructure in which they are deployed. In accordance with various disclosed embodiments, mitigation actions may be performed through the compute servers 120. To this end, in some embodiments, one or more artifacts are deployed in the compute servers 120, for example, as part of code deployed in the compute servers 120 via one or more code releases signed with the artifact as described herein. Accordingly, executable code of the artifact used to track and monitor mitigation activities as well as to perform code modification as described herein may be stored on or otherwise accessed and executed by the computer servers 120 in order to perform at least a portion of the disclosed embodiments.

The gap finder 130 is configured to perform at least a portion of the disclosed embodiments including, but not limited to, identifying control gaps with respect to protected assets (e.g., as described below with respect to FIG. 2). To aid in identifying control gaps, the gap finder 130 may be further configured to deduplicate assets among lists of assets from different controls, integrating with controls, or both.

To aid in various disclosed embodiments, the gap finder 130 may be configured to build or utilize a mitigation knowledge base 140. To this end, in some embodiments, the gap finder 130 may be configured with any or all of an impact analysis engine (IAE) 131, a reachability mitigation engine (ReME) 132, a runtime mitigation engine (RuME) 133, and a compile time mitigation engine (CTME) 134. The impact analysis engine 131 is configured to perform impact analysis in order to determine potential impacts of risks, for example, risks posed by control gaps identified as discussed herein. The engines 132, 133, and 134, are configured to perform mitigation actions related to reachability, runtime code modification, and compiler time code modification, respectively.

The mitigation knowledge base 140 defines one or more possible mitigation actions to be performed by mitigation engines (e.g., any of the engines 132, 133, and 134) for known vulnerable states. More specifically, the mitigation knowledge base defines respective mitigation actions to be performed by each mitigation engine for different vulnerable states such as, but not limited to, vulnerable states defined in one or more common vulnerabilities and exposures (CVE, not shown). These mitigation actions may be used to remediate control gaps by performing remediation actions including certain mitigation actions as discussed herein. In some implementations, the mitigation knowledge base 140 may be built by one or more other systems (not shown).

The controls 150 include cybersecurity tools which are configured to detect potential vulnerable states, to mitigate potential cyber threats, or both. The potential vulnerable states may include, but are not limited to, vulnerabilities and exposures. To this end, the controls 150 may be configured to generate and send alerts about any detected vulnerable states. In accordance with various disclosed embodiments, the gap finder 130 may be configured to identify control gaps with respect to the controls 150 and one or more protected assets (e.g., protected assets stored in or accessed by the compute servers 120, not shown). The controls 150 may alert on the vulnerable states using definitions of the vulnerable states from a CVE such that different detection tools may alert on vulnerable states in a comparable manner. Moreover, the controls 150 may alert on assets among the protected assets. As discussed herein, different controls among the controls 150 may identify assets differently. Accordingly, the gap finder 130 may be configured to deduplicate instances of assets among data provided by the controls 150.

The network diagram 100B depicts a cloud-based implementation in which the compute servers 120 are deployed in a cloud computing environment 125. The gap finder 130, the CI/CD manager 110, or both, may be deployed outside of such a cloud computing environment 125 and may communicate with the compute servers 120 via one or more cloud networks, the Internet, or any other networks (not shown) utilized to enable communications with the compute servers 120. Such networks may include, but are not limited to, a wireless, cellular or wired network, a local area network (LAN), a wide area network (WAN), a metro area network (MAN), the Internet, the worldwide web (WWW), similar networks, and any combination thereof.

Figure 2:
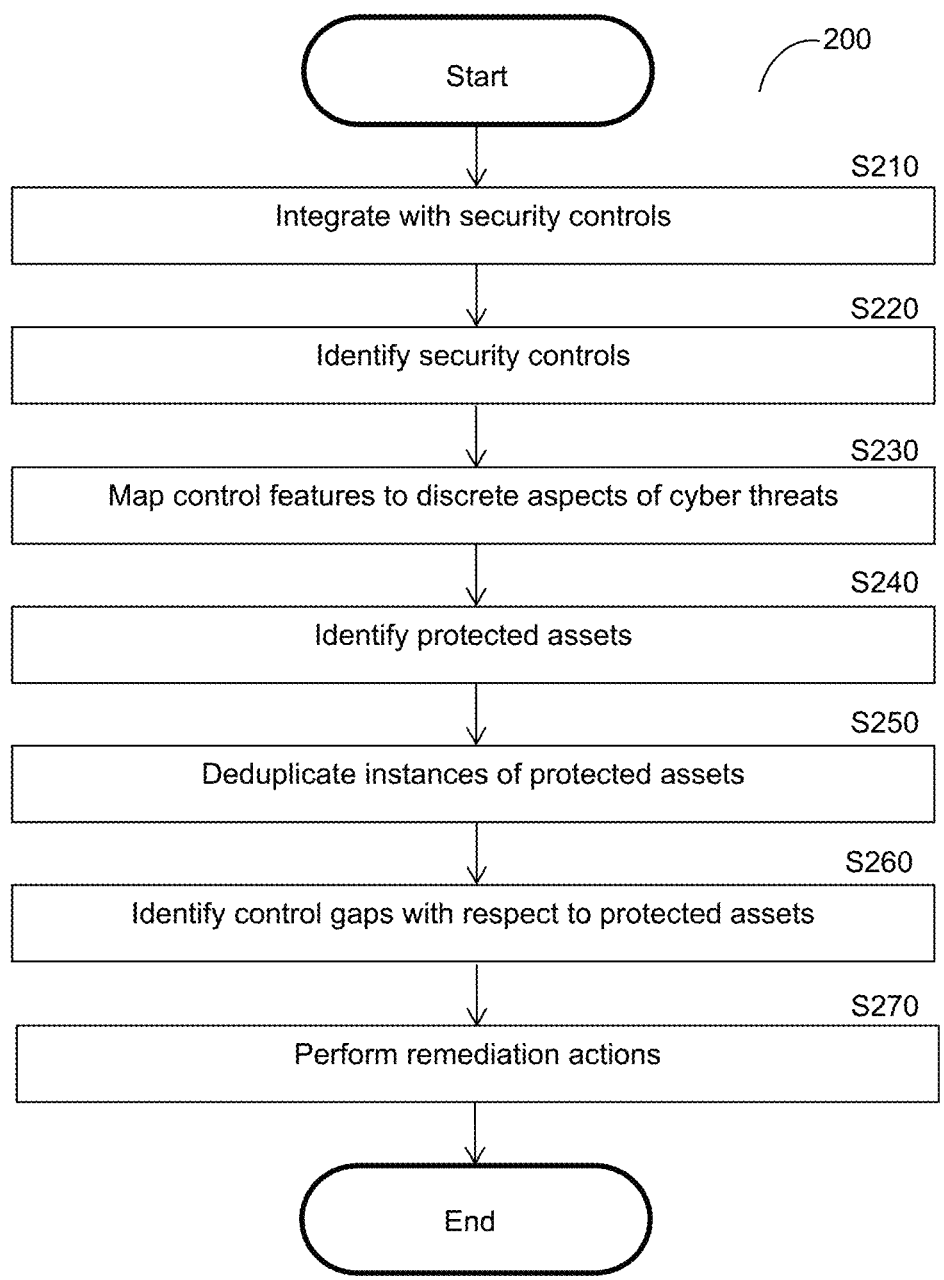
FIG. 2 is a flowchart illustrating a method for securing computing environments via identification of control gaps according to an embodiment.

FIG. 2 is a flowchart 200 illustrating a method for securing computing environments via identification of control gaps according to an embodiment. In an embodiment, the method is performed by the gap finder 130, FIGS. 1A-B.

At optional S210, integration is performed with at least a portion of a set of security controls (also referred to as "controls") deployed with respect to a computing environment. That is, integration is performed in order to integrate with some or all of the security controls configured to detect potential cyber threats, to perform remediation actions with respect to potential cyber threats, or both, within the computing environment.

In an embodiment, the integration includes a system (e.g., the system configured to perform the method of FIG. 2 such as the gap finder 130, FIGS. 1A-B) integrating with the controls. The integration is performed in order to enable the system to obtain data related to control deployments and other infrastructure activities which may be performed by or in relation to the controls, which in turn may be utilized to identify the controls and gaps in controls as discussed further below. In particular, the integration may be utilized to determine aspects of control deployments and configurations as well as assets protected by existing controls deployed with respect to the computing environment.

In an embodiment, the integration is realized via one or more artifacts. More specifically, in such an embodiment, integrating with the security controls includes defining and deploying such artifacts in a computing environment having assets to be protected by the controls for which control gaps may be identified. In a further embodiment, each artifact is or includes instructions in the form of executable code that, when executed by a processing circuitry, configure the processing circuitry to at least perform certain activities such as, but not limited to, tracking and recording mitigation activities being performed in a computing infrastructure in which it is deployed, as well as making adjustments within the computing infrastructure (e.g., adjusting configurations of components, altering executable code at runtime, altering compiler code, combinations thereof, and the like). An example process for integrating with security controls by deploying artifacts is described further below with respect to FIG. 5.

At S220, security controls (also referred to as "controls") deployed with respect to the computing environment are identified. In an embodiment, each control is a cybersecurity tool such as a process or other computing component configured to detect vulnerabilities, to mitigate vulnerabilities, or both. Each control may include or otherwise be configured with software instructions utilized to realize one or more control features such as, but not limited to, antispyware, vulnerability detection, uniform resource locator (URL) filtering, file blocking, data filtering, denial of service (DOS) protection, and the like. The control features may be defined as capabilities of the controls or other features known to be associated with respective controls.

In an embodiment, the identified security controls include the security controls integrated at S210. Further, security controls may also be identified based on data from other security controls such as the controls integrated at S210. Alternatively or additionally, some or all of the security controls may be identified based on data indicating software components deployed in or otherwise used with respect to the computing environment such as, but not limited to, a list of software components of the computing environment.

At optional S230, control features of the identified security controls may be mapped to discrete aspects of cyber threats. In an embodiment, S230 includes creating a mapping between control features or other capabilities of controls and known attack vectors or other discrete aspects of known cyber threats. The control features may include features used for control operations including detecting potential cyber threats, mitigating potential cyber threats, both, and the like.

Such a mapping may be utilized in order to identify relationships between control configurations and deployments with cyber threats which, in turn, may be utilized to identify areas where there may be gaps in security related to control configurations and deployments (i.e., control gaps). Alternatively or additionally, the mapping may be utilized for deduplication, for example, by utilizing the mapping to identify instances of assets in the same position relative to different controls which may be represented differently in the data from those controls, but which represent the same underlying asset. Further, the mapping may be utilized to identify security features provided by certain controls, which may be utilized to determine controls which may be effective for remediating control gaps.

In this regard, it has been identified that some controls may be touted as having certain features or otherwise being suitable for detecting and mitigating certain types of cyber threats, but that these assertions may be blanket assertions (e.g., "control ABC is effective at mitigating all cyber threats defined in the MITRE common weakness enumeration list") that do not accurately reflect which threats actually effectively mitigated by certain controls. Accordingly, deploying a control whose advertising or metadata indicates that the control is effective against a blanket list of threats may result in failing to properly secure the environment when the control has little to no actual remedial effect against a particular threat. It has further been identified that certain attack patterns or other aspects of threats may only be effectively mitigated when certain control features are present. Mapping specific control features to specific aspects of threats allows for more accurately identifying which control features should be enabled in order to effectively secure the computing environment when control gaps which may lead to exposure to certain kinds of threats are identified.

At S240, assets to be protected (also referred to as "protected assets") by security controls within the computing environment are identified. Each protected asset is a computing asset deployed in a computing environment such as, but not limited to, a hardware asset (e.g., a server), a software asset (e.g., an application, a process, a function, a software container, a virtual machine, etc.), or a network asset (e.g., a router, switch, server, firewall, etc.).

More specifically, in an embodiment, the assets are identified as sets of asset-identifying data representing respective assets. As discussed further below, at least some of the sets of asset-identifying data may be sets of data from different controls that represent the same underlying asset but express the identity of that asset using different types of identifying data, different values of identifying data, both, and the like. Such different sets of asset-identifying data may be deduplicated as discussed below with respect to S250 in order to uniquely identify the assets after the initial identification of sets of data representing respective assets.

In an embodiment, identifying the assets to be protected includes analyzing data indicating software components deployed in the computing environment. Such data may include, but is not limited to, lists of software components for the computing environment. When security controls are integrated with (e.g., as discussed above with respect to S210), at least some of the assets may be identified based on data from the integrated security controls.

At optional S250, instances of the protected assets may be deduplicated among data from the controls. More specifically, instances of the protected assets among data from different security controls among the identified security controls are deduplicated. In an embodiment, deduplicating the instances of the assets includes determining that multiple instances of assets represent the same asset. Such determinations may be utilized to, for example, determine whether two controls are deployed so as to allow for protecting that asset using both controls even when the two controls express the identity of the asset differently.

In an embodiment, deduplicating the assets includes obtaining lists of assets from each control, analyzing the lists to determine asset-identifying data in the lists, and correlating between sets of asset-identifying data from different controls. In a further embodiment, the asset-identifying data is enriched, and the enriched asset-identifying data is used to correlate between data from different controls. The result is unique identifications of each distinct asset among the lists of assets from different controls. An example process for deduplicating assets is described further below with respect to FIG. 3.

In this regard, it is noted that different security controls may report on the same asset differently (e.g., using different identifiers for that asset or otherwise outputting data which identifies the asset differently). Deduplicating instances of the assets among data from different security controls thereby allows for more accurately identifying security control gaps, and may further improve efficiency by reducing the amount of asset instances to be processed during subsequent processing. More specifically, by identifying instances of the same asset in data from different controls, data from those controls can be correlated in order to form a more complete view of the coverage of the security controls with respect to a given asset. This, in turn, allows for more accurately identifying where gaps in such security controls exist, for example, reducing false positives where a control gap is identified with respect to a particular asset due to differences in data between controls protecting the asset when in reality the controls are deployed and configured in order to protect the asset.

At S260, security control gaps (also referred to as "control gaps") are identified with respect to the protected assets. Each security control gap may be or may include a gap in security defined with respect to a computing asset protected by one or more security and may be defined with respect to one or more lacking types of controls, one or more specific control features which are lacking, or a combination thereof. In a further embodiment, each control gap is or includes a gap in configuration, deployment, or both, of the controls with respect to a given protected asset. Such a control gap may cause the controls to fail to adequately protect the asset against potential cyber threats. The control gaps may be or may include gaps defined with respect to coverage, capabilities, conflicting control policies, missing software components such as plugins, combinations thereof, and the like. An example process for identifying control gaps is described further below with respect to FIG. 4.

At S270, remediation actions are performed with respect to the identified control gaps. The remediation actions may include mitigation actions or other remedial activities such as, but not limited to, deploying new controls, changing deployments of existing controls, reconfiguring controls, combinations thereof, portions thereof, and the like.

In some embodiments, performing the remediation actions may include performing an impact analysis with respect to the control gaps and prioritizing the control gaps to address based on the impact analysis. The impact analysis may include analyzing the configurations of the controls with respect to exposed assets (i.e., protected assets whose respective protecting controls demonstrate one or more control gaps), analyzing risks posed by potential threats to those assets, or both. In a further embodiment, a risk score which accounts for both risk aggregators (i.e., factors which increase the likelihood of harm, severity of harm, or both, for a given threat) as well as control mitigators (i.e., the presence of certain controls or combinations of control which serve to mitigate such threats), and the prioritization may be performed based on these risk scores (e.g., by prioritizing control gaps with higher risk scores).

In another embodiment, any or all of the remediation actions may be realized via mitigation actions configured to perform mitigation actions related to adjusting components in a computing environment and, in particular, security controls. In a further embodiment, the mitigation engines include one or more of a reachability mitigation engine, a runtime mitigation engine, and a compile time mitigation engine, for example as discussed above with respect to FIGS. 1A-B.

In some embodiments, the remediation actions may include reporting the identified control gaps and, optionally, which other remediation actions were performed in order to remediate the control gaps. Reporting the control gaps may allow for subsequent evaluation of potential flaws in security for the computing environment, for example, in order to allow for developing playbooks of remediation actions to take for future control gaps. Moreover, reporting which remediation actions were taken may allow for evaluating the effectiveness of those remediation actions, which in turn may be utilized to revise policies or other rules used to determine which remediation actions to perform when future control gaps are identified.

In this regard, it is noted that a possible remediation which could be utilized in accordance with existing solutions would be to reconfigure controls deployed with respect to a computing environment in order turn on all control features of those controls. However, this remediation solution may not optimally secure the environment. For example, some control features of controls may be unavailable for certain deployments of those controls such that those features either cannot be turned on or would not work effectively when turned on. In some cases, control features for a given control may not be available for the current version such that the control may need to be patched before those control features can be turned on such that deploying a new control may be needed in order to implement those control features.

Additionally, when the control gap is caused by a lack of a control having certain control features, simply turning on all available control features may not adequately secure the environment and deployment of new controls may be necessary. Identifying control gaps as described herein therefore allows for more effectively securing the environment against potential threats by more granularly determining potential security flaws within the environment, thereby improving cybersecurity within the environment.

Further, using mapping between control features and attack patterns or other aspects of cyber threat may further improve determining which remediation actions will most effectively secure a computing environment having a control gap. That is, such a mapping may be utilized when a control gap is discovered in order to identify for potential threats the asset is exposed to as a result of the control gap, which control features are effective for protecting against those threats. This may allow for determining which control features should be enabled with respect to the asset, which in turn may allow for determining whether to reconfigure existing controls and how (e.g., which control features to turn on) as well as whether new controls should be deployed (e.g., controls which possess control features that existing controls deployed with respect to the asset lack).

Figure 3:
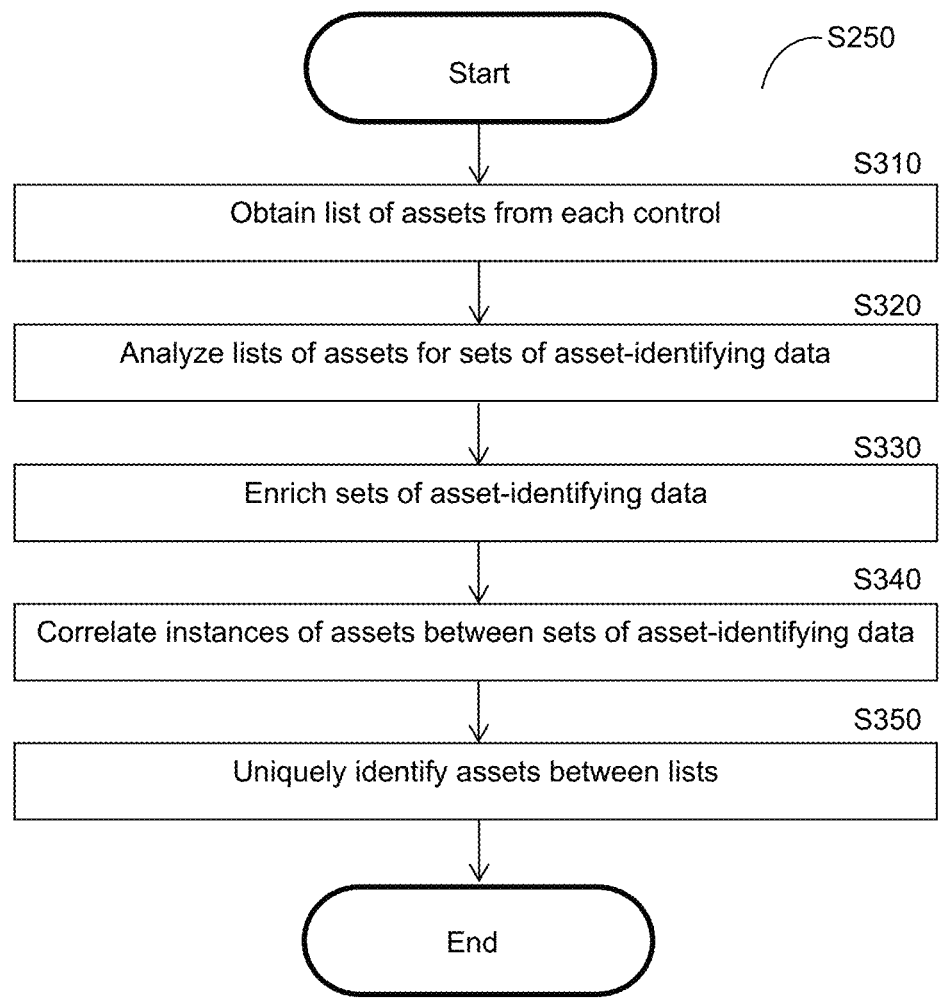
FIG. 3 is a flowchart illustrating a method for asset deduplication according to an embodiment.

FIG. 3 is a flowchart S250 illustrating a method for asset deduplication according to an embodiment.

At S310, a list of assets is obtained from each of a set of controls, for example, from any or all of the controls deployed with respect to a target computing environment whose assets are to be secured using controls. In an embodiment, obtaining the lists of assets may include sending requests for such lists or otherwise receiving the lists from the controls.

At S320, the lists of assets are analyzed in order to identify one or more sets of asset-identifying data among the lists. In an embodiment, analyzing the lists of assets includes applying one or more predetermined rules defining properties of asset-identifying data which may be included among such lists. Each set of asset-identifying data indicates an identity of a respective instance of an asset, and may be expressed in the form of one or more identity properties.

The identity properties may include, but are not limited to, name or other asset-specific identifiers (e.g., a Media Access Control [MAC] address), asset type, network address (e.g., Internet Protocol [IP] address), combinations thereof, and the like. At least some instances of the assets may have identity properties in different formats, which use different values (e.g., different IP addresses, names, or MAC addresses), which use different types of identifying values (e.g., one control uses name while another uses MAC address, or one control uses IP address while another uses MAC address), and other control-specific aspects of expressing the identity of a given asset which may cause the same asset to be represented differently in data between different controls.

At S330, the sets of asset-identifying data are enriched. More specifically, the sets of asset-identifying data are enriched in order to add context to the identifications of the asset instances therein. In an embodiment, such enrichment may include mapping between addresses related to assets (e.g., mapping network addresses used by assets), text matching between names (e.g., to identify different instances of the same name), both, and the like. The text matching between names may be performed using one or more predetermined name text matching rules which define whether two names match despite potential differences. Such name text matching rules may be defined with respect to a distance between text of different names (e.g., if the distance between text of names is below a predetermined threshold, the names may be determined as matching), based on synonymous portions of names which may be used by different controls (e.g., prefixes or suffixes which are known to be used for the same kind of asset by controls using different naming conventions), both, and the like. The results of such mapping or text matching may be added to the asset-identifying data, thereby creating enriched sets of asset-identifying data.

At S340, instances of assets are correlated between the sets of asset-identifying data. In an embodiment, correlating the instances of assets includes applying one or more predetermined sets of asset correlation rules between sets of asset-identifying data. Such asset correlation rules may define a number of identity properties, specific identity properties, both, and the like, needed to match instances of assets as belonging to the same underlying asset between different sets of asset-identifying data.

At S350, one or more assets are uniquely identified among the lists of assets from different controls. More specifically, uniquely identifying an asset includes identifying two or more instances of the asset on different lists. That is, each asset is uniquely identified as being the same underlying asset despite any differences in expression of the identity of the asset between different lists. Each uniquely identified asset may be identified with respect to two or more instances of assets and, in particular, instances of assets which were correlated based on their respective sets of asset-identifying data at S340.

In some embodiments, a set of uniquely identifying asset data may be generated for each uniquely identified asset. The set of uniquely-identifying asset data for an asset may include the different asset-identifying data of the asset from the asset lists of different controls such as, but not limited to, each type of identifier (e.g., name, IP address, MAC address, etc.), aliases or alternative identifiers (e.g., multiple names or IP addresses used for the asset by different controls), both, and the like. The set of uniquely-identifying asset data for a given asset may include different observed aspects of identification for that asset, which in turn may be utilized to more efficiently recognize future instances of that asset in subsequent assets lists (e.g., from controls deployed after a current iteration of unique asset identification).

Figure 4:
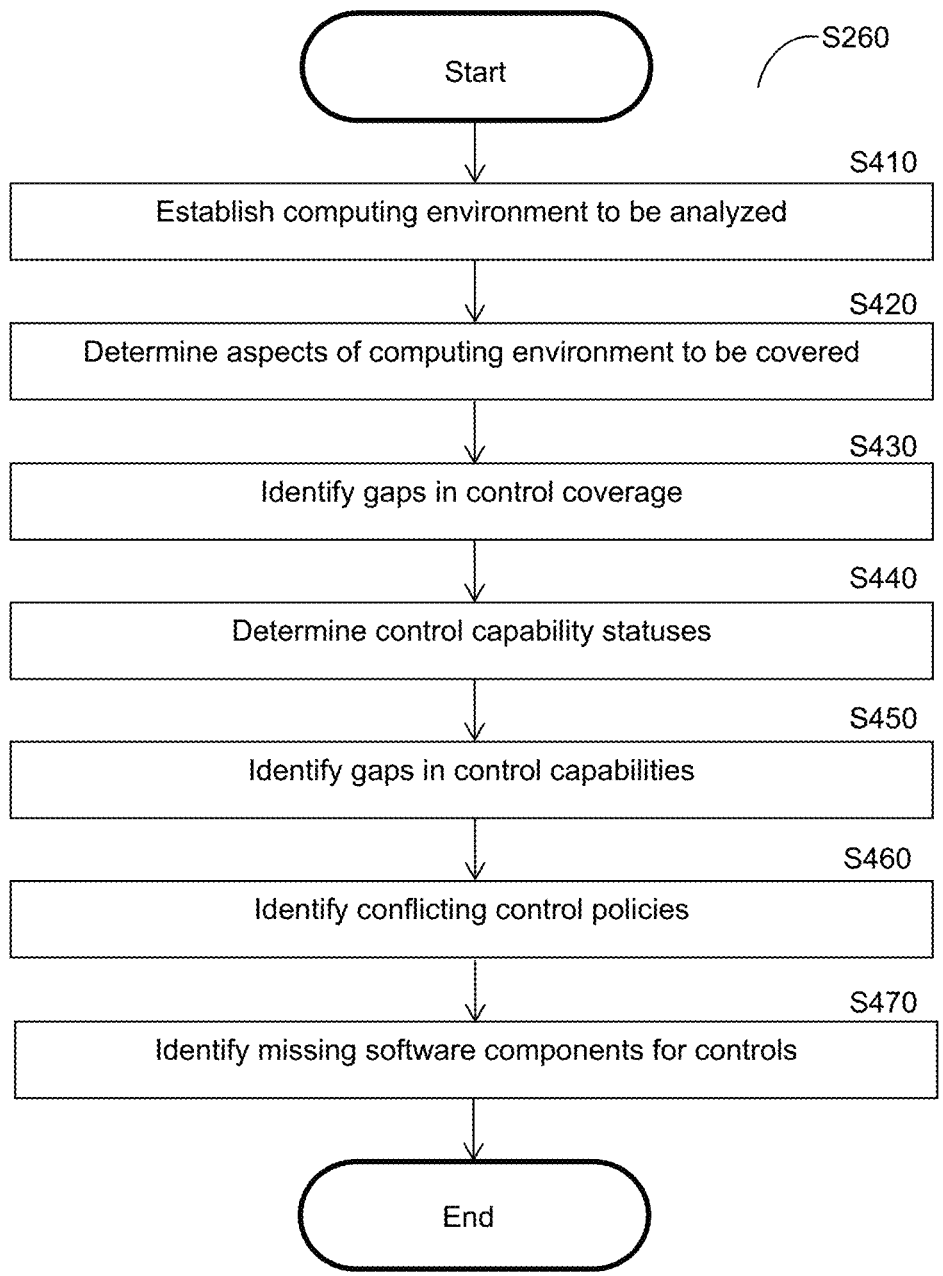
FIG. 4 is a flowchart illustrating a method for identifying control gaps according to an embodiment.

FIG. 4 is a flowchart S260 illustrating a method for identifying control gaps according to an embodiment.

At S410, a computing environment to be analyzed for control gaps is identified. The computing environment may be a computing environment in which one or more protected assets identified for protection are deployed, for example as discussed above with respect to S240. In some embodiments, specific assets to be analyzed for control gaps are identified, i.e., such that potential control gaps are identified with respect to those assets. The computing environment may be, for example but not limited to, the cloud computing environment 125, FIG. 1B, or any other computing environment in which assets such as the compute servers 120, FIGS. 1A-B, are deployed.

At S420, aspects of the computing environment to be covered via controls are determined. In an embodiment, the aspects of the computing environment to be covered include a portion of the computing environment corresponding to potential deployment locations for controls. Such potential deployment locations may be defined relative to respective assets. That is, each potential deployment location may be defined as a communicative space between the asset and one or more other computing components (e.g., other systems, software components, network components, etc.). In particular in some implementations, the potential deployment locations may include a location defined as between the asset (or a system which manages access to the asset) and one or more public-facing networks (such as, but not limited to, the Internet). In other words, each potential deployment location is defined as a potential logical location where a control may be deployed in-line between an asset and the Internet or other computing components or otherwise may be deployed to detect or mitigate threats realized via traffic between the asset and the other computing components along the potential path of exploitation.

In an embodiment, determining the aspects of the computing environment to be covered includes determining one or more potential paths of exploitation for the protected asset with respect to controls. The determined paths of exploitation may be utilized, for example, to identify potential deployment locations where controls are not currently deployed or by identifying controls protecting assets whose configuration presents gaps in security for their respective protected assets. That is, gaps in coverage determined based on these potential deployment locations may be defined with respect to an absence of one or more controls, one or more control features, or both, covering communications between a protected assets and one or more other computing components.

In an embodiment, determining the paths of exploitation includes analyzing a code path from a vulnerable process to a protected asset. The vulnerable process may be, for example, a process identified as vulnerable in outputs from controls or otherwise identified as misconfigured in a way which may leave the process susceptible to exploitation. The analysis may be based on data retrieved from other sources, e.g., other components deployed in or with respect to the computing infrastructure indicating communications between and among components of the computing infrastructure and, more specifically, between processes executed via the computing infrastructure. In a further embodiment, each potential path of exploitation may be identified as paths of communication via one or more components that lead from the protected asset to the Internet or one or more other external networks.

At S430, gaps in coverage by controls are identified. More specifically, the gaps in coverage are defined with respect to the aspects determined at S420. In an embodiment, identifying such gaps in coverage includes determining, for each potential path of exploitation, whether a control is deployed along the potential path of exploitation and, in particular, such that the control is in-line between the asset and one or more other computing components along the potential path of exploitation, or otherwise deployed such that the control detects or mitigates threats realized via traffic between the asset and the other computing components along the potential path of exploitation.

In a further embodiment, identifying the gaps in coverage further includes checking whether certain types of controls are deployed with respect to the potential paths of exploitation. To this end, in such an embodiment, identifying the gaps in coverage may further include applying control type path checking rules which define expected types of controls to be deployed with respect to potential paths of exploitation between an asset and one or more other computing components. The control type path checking rules may be further defined based on a type of asset (e.g., process, software container, server, etc.), a type of the other computing components (e.g., a network, another process or server, etc.), both, and the like.

At S440, control capability statuses of controls among the computing environment are determined. In an embodiment, determining the control capability statuses includes checking whether each of a set of control features is turned on for one or more of the controls. In a further embodiment, each control feature to be checked for each control may be determined by applying one or more predetermined control feature checking rules. The control feature checking rules may define control features which are supposed to be enabled in certain circumstances and, to this end, may further define the circumstances where specific control features should be enabled. The circumstances in which certain control features are to be enabled may be defined with respect to a type of asset to be protected, specific assets to be protected, a type of the control, a combination thereof, and the like.

At S450, gaps in control capabilities are determined based on the control capability statuses. In an embodiment, the gaps in control capabilities are determined based on results of applying the control feature checking rules and, specifically, based on whether each control feature to be enabled in the circumstances for a given asset or control protecting the asset is, in fact, enabled.

As a non-limiting example, certain control features related to both static analysis of container images as well as runtime analysis of container instances may be utilized to secure a protected asset accessible via a software container such that control features which both certain types of static and runtime analysis functions must be enabled in order to adequately protect the asset. In such an example, identifying that controls deployed with respect to the asset are configured to perform the required static analysis functions but not the required runtime analysis functions would result in determining gaps in control capabilities. Such a gap may result in a system which runs the container effectively failing to observe potential vulnerabilities at runtime and only identifying vulnerabilities which can be found via static scanning.

At S460, conflicting control policies are identified among the controls deployed with respect to the computing environment. In an embodiment, identifying the conflicting control policies includes checking policies of controls applied to the same asset against a predetermined list of known conflicts between control policies. Such a list of known conflicts may indicate pairs of control policies which conflict such as, but not limited to, control policies which are impossible to implement together, control policies which defeat the purpose of the other, or otherwise which cause conflicting results.

As a non-limiting example, a control policy for blocking all traffic may conflict with any control policy which blocks less than all traffic (e.g., 50% of traffic). In this manner, conflicts between policies may be determined for control policies applied to controls from the same control provider or from different control providers.

At S470, missing software components of one or more of the controls are identified. The missing software components may be or may include plugins or other code which add one or more features (e.g., control features) to a computer program (i.e., one of the controls). That is, when such a software component is missing from a given control, that control may not actually possess the capabilities it would otherwise be expected to have, which could result in a control gap in the sense that the control does not have all of the control features for detecting or remediating certain cyber threats even though the control would normally be expected to have those control features.

In an embodiment, identifying the missing controls includes comparing a list of installed software components for each control to a predetermined list of expected software components for the control. In a further embodiment, any software components which are on the list of expected software components for the control but are not among the list of installed software components for the control are identified as the missing software components for the control. The list of expected software components may be, but is not limited to, a most recent list of suggested software components defined by a provider of the control, by an organization which provides information about cyber threats, and the like.

In another embodiment, the missing controls are identified further with respect to versions. That is, the list of installed software components may identify the installed software components based on the version of software installed for each software component, and the predetermined list of expected software components may likewise identify the expected software components further using versions of the expected software components. In this regard, the missing controls may effectively be identified based on outdated or otherwise prior versions of the software. That is, identifying that the list of installed software components lacks one or more software components having the expected version for those software components may be utilized to identify outdated software versions as a control gap.

In this regard, it is noted that only looking at whether a given control is on or off based on manually defined rules for control configurations can lead to failures in security. For example, if a policy is defined that is supposed to be applied to all host groups to configure controls in a certain manner, only determining whether those controls are turned on may lead to falsely determining that the controls meet the policy.

Also, vulnerability scanners may face challenges in identifying whether an asset has actually been inspected. More specifically, some existing vulnerability scanner solutions involve installing agents on assets, and the scanner may determine whether the asset has been inspected based on whether the asset has an agent installed or not. However, only checking whether the asset has an agent installed may be misleading. For example, agentless scanning solutions may scan an asset without installing any agent, which may lead to falsely determining that an asset is not secure. Further, if an agent has been installed but has either not yet performed a scan or has not performed a scan recently, determining that the asset has been scanned may lead to falsely determining that the asset is secure.

Additionally, identifying control gaps in this manner may allow for applying policies which are more granularly defined, thereby further improving security of the computing environment, efficiency of remediation, or both. As a non-limiting example, a policy may be defined in order to require that a certain kind of control (e.g., a control having certain control features) be applied to servers, and another kind of control on endpoints. The identified security gaps may be utilized to identify whether the applicable controls are applied to the respective types of assets defined in the policy.

Figure 5:
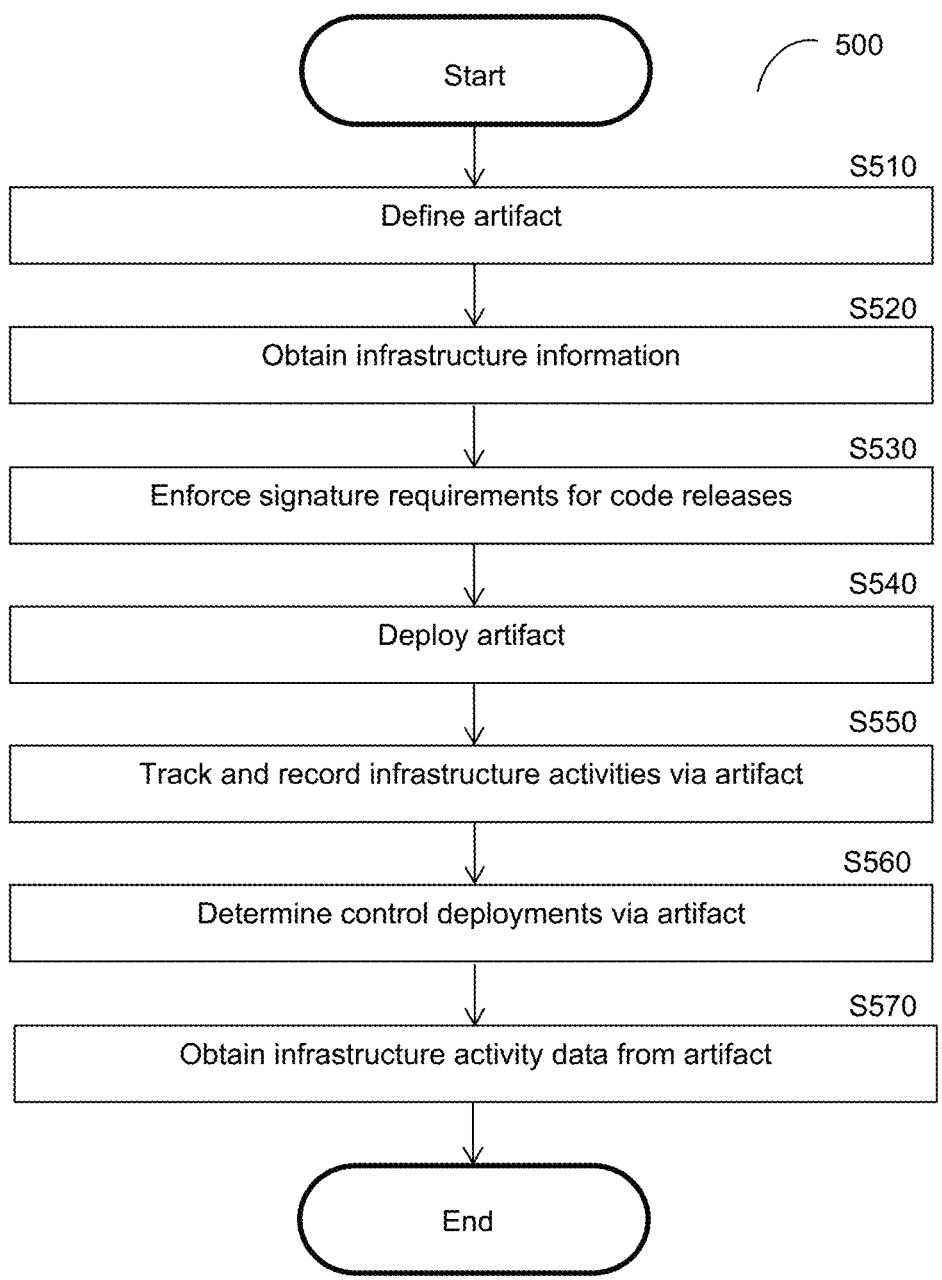
FIG. 5 is a flowchart illustrating a method for integrating with security controls according to an embodiment.

FIG. 5 is a flowchart 500 illustrating a method for integrating with security controls according to an embodiment. In an embodiment, the method is performed by the gap finder 130, FIGS. 1A-B.

At S510, an artifact is defined. The artifact is defined such that it is configured at least to can track and record mitigation activities being performed in a computing infrastructure in which it is deployed, as well as to make adjustments within the computing infrastructure (e.g., adjusting configurations of components, altering executable code at runtime, altering compiler code, combinations thereof, and the like). The artifact can be used as a hook to make changes at runtime and at compile time in order to perform mitigation actions as described herein.

In an embodiment, the artifact is or includes instructions in the form of executable code that, when executed by a processing circuitry, configure the processing circuitry to at least perform the activities defined by the instructions of the artifact. To this end, defining the artifact may include defining such instructions and storing a copy of executable instructions encoding such instructions so that the executable code may be copied and deployed.

Once the artifact has been defined, instructions of the artifact may be incorporated into code releases via signing and utilized to implement various disclosed embodiments. To this end, the artifact may be defined as part of a code signing certificate or other piece of data to be used for signing code releases such that any signatures signed using that certificate or data includes an instance of the artifact in the form of a copy of the executable code of the artifact. This, in turn, allows the artifact to serve as a hook in the code release for performing at least a portion of the disclosed embodiments. Such code releases may occur when new components are deployed in the computing infrastructure, i.e., the code releases may include executable code of software components or code to be used by hardware components, and the code of such code releases may include the executable code of the artifact such that the artifact is deployed with any components deployed as part of a given code release signed using the artifact.

At S520, infrastructure information about a computing infrastructure is obtained. The computing infrastructure is a computing infrastructure for which the artifact will be deployed. The infrastructure information may include, but is not limited to, components, processes executed by those components, information indicating which components communication with which other components, combinations thereof, and other information which may be relevant to relative locations where the artifact can be deployed in order to be capable of performing the mitigation actions as described herein. More specifically, the infrastructure information may include information potentially related to code releases (e.g., where code may be deployed), and artifacts may be deployed with each code release such that one or more artifacts are deployed as part of code introduced in any given code release.

At S530, requirements for signatures for code releases are enforced on the computing infrastructure via the artifact. To this end, enforcing the signature requirements for the code releases may include enforcing one or more policies requiring all code releases in the computing infrastructure to be signed using an instance of the artifact. Such policies may be implemented in the computing infrastructure in order to facilitate the disclosed embodiments. In some implementations, the requirements may be enforced via a CI/CD manager (e.g., the CI/CD manager 110, FIGS. 1A-B). To this end, in some embodiments, enforcing the signature requirements may include sending data indicating such policies to the CI/CD manager or otherwise instructing the CI/CD manager to enforce such policies. Moreover, enforcing the signature requirements may include sending a copy of the executable code of the artifact to be used for signing according to the signing policies being enforced.

At S540, the artifact is deployed with respect to the computing infrastructure. The artifact is deployed such that it can track, and record mitigation activities being performed in at least a portion of the computing infrastructure, as well as such that it can make adjustments within the relevant portion of the computing infrastructure (e.g., adjusting configurations of components, altering executable code at runtime, altering compiler code, combinations thereof, and the like). More specifically, in accordance with the policies enforced at S430, an instance of the artifact may be created and deployed in one or more portions of code for every code release via signing of the code release with such an artifact instance.

In some embodiments, multiple artifacts may be deployed and utilized in the process of FIG. 5. As noted above, each artifact may be realized as a set of instructions in the form of executable code included in a certificate or other data incorporated in signatures. To this end, the artifact is deployed as part of deployment of any code releases signed using the artifact.

At S550, mitigation activities being performed in the computing infrastructure are tracked, and data indicating the mitigation activities are recorded via the artifact. The data recorded by the artifact may include an indication of mitigation actions performed with respect to each process or other component in the infrastructure. More specifically, the activities tracked via the artifact may include activities performed by a set of controls within the computing environment.

At S560, control deployments are determined based on the infrastructure activities tracked via the artifact. In an embodiment, the artifact includes code for determining the control deployments. To this end, in such an embodiment, determination of the control deployments is realized via execution of the code via the artifact.

At S570, infrastructure activity data is obtained from the artifact. In an embodiment, the infrastructure activity data includes activities performed by controls within the computing environment such as, but not limited to, mitigation actions. In a further embodiment, the infrastructure activity data also includes the control deployments determined via the artifact. Such control deployments and other infrastructure data may be utilized as described herein to identify control gaps (e.g., based on locations where controls should be deployed but are not according to the control deployments), to report on potential control gaps (e.g., as part of an output illustrated via graphical user interface such as, but not limited to, the output shown in FIG. 6), both, and the like.

It should be noted that certain embodiments discussed with respect to FIG. 5 are described as using one artifact, but that at least some disclosed embodiments are not limited as such may be equally applicable to implementations using multiple artifacts. As a non-limiting example, multiple artifacts may be deployed in a computing environment, with each artifact tracking and recording infrastructure activities for a respective portion of the computing environment. In such embodiments, control deployments within the computing environment may be determined based on infrastructure activities tracked by multiple artifacts.

FIG. 6 is an illustration 600 of an example output of control gap findings. The non-limiting example output shown in the illustration 600 demonstrates coverage gaps related to security controls such as lacking agents to act as security controls for certain Internet-facing assets. Additional information such as, but not limited to, identifiers of affected assets, indicators of whether a protected asset is Internet-facing, severity, and the like, may also be reported in order to aid in, for example, prioritization.

Figure 7:
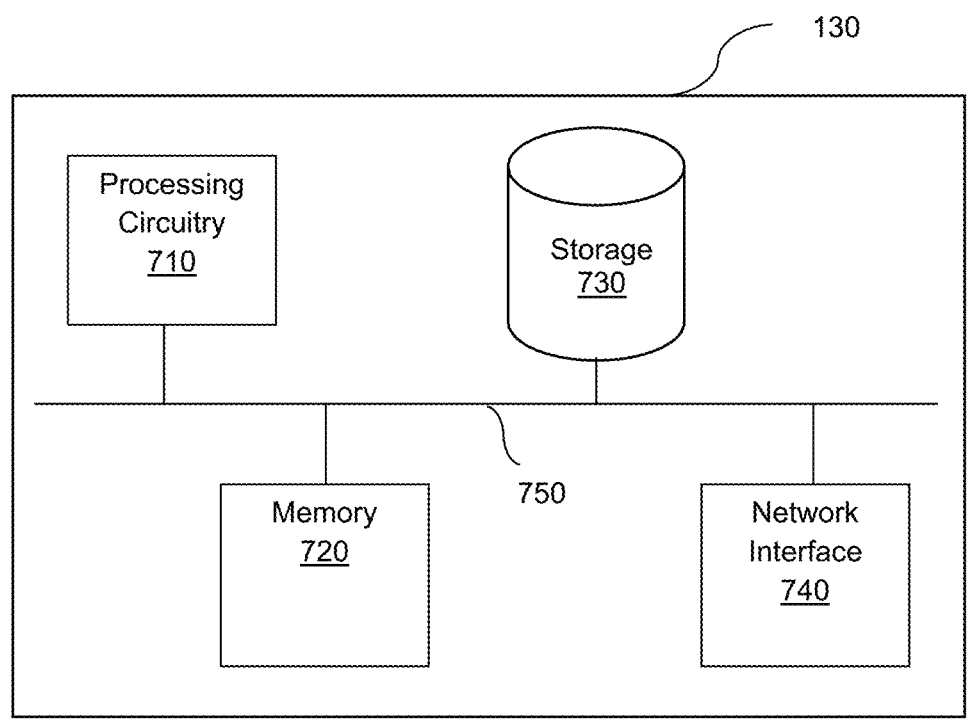
FIG. 7 is a schematic diagram of a gap finder according to an embodiment.

FIG. 7 is an example schematic diagram of a gap finder 130 according to an embodiment. The gap finder 130 includes a processing circuitry 710 coupled to a memory 720, a storage 730, and a network interface 740. In an embodiment, the components of the gap finder 130 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the gap finder 130 to communicate with other systems, devices, components, applications, or other hardware or software components, for example as described herein.

It should be understood that the embodiments described herein are not limited to the specific architecture illustrated in FIG. 7, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for identifying security control gaps, comprising:
    integrating with a set of security controls deployed with respect to a computing environment, wherein integrating with the set of security controls further comprises deploying an artifact in the computing environment, wherein the artifact is configured to record a plurality of activities performed in the computing environment by the set of controls, wherein integrating with the set of security controls further comprises enforcing at least one policy requiring code releases in the computing environment to be signed using an instance of the artifact;
    identifying at least one computing asset to be protected by the set of security controls;
    identifying at least one security control gap in the computing environment based on a configuration of the set of security controls, wherein each security control gap is defined with respect to one of the identified at least one computing asset; and
    performing at least one remediation action with respect to the identified at least one security control gap.

2. The method of claim 1, further comprising:
    correlating between sets of asset-identifying data generated by the set of security controls; and
    deduplicating a plurality of asset instances represented in the asset-identifying data generated by the set of security controls deployed with respect to the computing environment in order to create a set of deduplicated asset instances, wherein deduplicating the plurality of asset instances includes uniquely identifying each of the plurality of asset instances as corresponding to a respective protected computing asset of the at least one computing asset based on the correlation between the sets of asset-identifying data generated by the set of security controls, wherein the at least one security control gap is identified based further on the set of deduplicated asset instances.

3. The method of claim 1, wherein integrating with the set of security controls further comprises:
    determining a set of control deployments for the set of controls based on the plurality of activities recorded by the artifact, wherein the at least one security control gap is determined based further on the set of control deployments.

4. The method of claim 1, further comprising:
    mapping a plurality of capabilities of security controls among the set of security controls to respective cyber threats, wherein the at least one security control gap is identified based further on the mapping.

5. The method of claim 1, wherein the set of security controls is a set of first security controls, wherein identifying the at least one security control gap further comprises:
    determining at least one path of exploitation, wherein each path of exploitation is a path of communication between one of the at least one computing asset and at least one computing component, wherein the at least one security control gap includes a lack of a second security control at a deployment location defined with respect to the at least one path of exploitation.

6. The method of claim 1, wherein identifying the at least one security control gap further comprises:
    determining, for each security control of the set of security controls, a corresponding set of predetermined features to be used by the security control; and
    determining whether each security control of the set of security controls is configured to utilize each feature of the corresponding set of predetermined features, wherein the at least one security control gap includes a first security control of the set of security controls lacking configuration to perform at least one feature of the corresponding set of predetermined features.

7. The method of claim 1, wherein identifying the at least one security control gap further comprises:
  analyzing a pair of security controls from among the set of security controls, the pair of security controls including a first security control and a second security control of the set of security controls, wherein at least one first security control policy is applied to the first security control, wherein at least one second security control policy is applied to the second security control, wherein analyzing the pair of security controls further comprises analyzing the at least one first security control policy and the at least one second security control policy based on a set of predetermined security control policy conflicts;
  identifying at least one conflict between the at least one first security control policy and the at least one second security control policy based on the analysis, wherein the at least one security control gap includes the identified at least one conflict between the at least one first security control policy and the at least one second security control policy.

8. The method of claim 1, wherein identifying the at least one security control gap further comprises:
  determining, for each security control of the set of security controls, a corresponding set of predetermined software components to be used by the security control, wherein each predetermined software component to be used by the security control has a corresponding version; and
  determining that a first security control of the set of security controls has an outdated version of at least one first software component of the set of predetermined software components, wherein the at least one security control gap includes the lack of the at least one first software component by the first security control.

9. The method of claim 1, wherein performing the at least one remediation action includes reconfiguring at least one security control of the set of security controls.

10. The method of claim 1, wherein the set of security controls is a set of first security controls, wherein performing the at least one remediation action includes deploying at least one second security control based on the identified at least one security control gap.

11. A non-transitory computer readable medium having stored thereon instructions for causing a processing circuitry to execute a process, the process comprising:
  integrating with a set of security controls deployed with respect to a computing environment, wherein integrating with the set of security controls further comprises deploying an artifact in the computing environment, wherein the artifact is configured to record a plurality of activities performed in the computing environment by the set of controls, wherein integrating with the set of security controls further comprises enforcing at least one policy requiring code releases in the computing environment to be signed using an instance of the artifact;
  identifying at least one computing asset to be protected by the set of security controls;
  identifying at least one security control gap in the computing environment based on a configuration of the set of security controls, wherein each security control gap is defined with respect to one of the identified at least one computing asset; and
  performing at least one remediation action with respect to the identified at least one security control gap.

12. A system for identifying security control gaps, comprising:
  a processing circuitry; and
  a memory, the memory containing instructions that, when executed by the processing circuitry, configure the system to:
  integrate with a set of security controls deployed with respect to a computing environment, wherein integrating with the set of security controls further comprises deploying an artifact in the computing environment, wherein the artifact is configured to record a plurality of activities performed in the computing environment by the set of controls, wherein the system is further configured to enforce at least one policy requiring code releases in the computing environment to be signed using an instance of the artifact;
  identify at least one computing asset to be protected by the set of security controls;
  identify at least one security control gap in the computing environment based on a configuration of the set of security controls, wherein each security control gap is defined with respect to one of the identified at least one computing asset; and
  perform at least one remediation action with respect to the identified at least one security control gap.

13. The system of claim 12, wherein the system is further configured to:
  correlate between sets of asset-identifying data generated by the set of security controls; and
  deduplicate a plurality of asset instances represented in the asset-identifying data generated by the set of security controls deployed with respect to the computing environment in order to create a set of deduplicated asset instances, wherein deduplicating the plurality of asset instances includes uniquely identifying each of the plurality of asset instances as corresponding to a respective protected computing asset of the at least one computing asset based on the correlation between the sets of asset-identifying data generated by the set of security controls, wherein the at least one security control gap is identified based further on the set of deduplicated asset instances.

14. The system of claim 12, wherein the system is further configured to:
  determine a set of control deployments for the set of controls based on the plurality of activities recorded by the artifact, wherein the at least one security control gap is determined based further on the set of control deployments.

15. The system of claim 12, wherein the system is further configured to:
  map a plurality of capabilities of security controls among the set of security controls to respective cyber threats, wherein the at least one security control gap is identified based further on the mapping.

16. The system of claim 12, wherein the set of security controls is a set of first security controls, wherein the system is further configured to:
  determine at least one path of exploitation, wherein each path of exploitation is a path of communication between one of the at least one computing asset and at least one computing component, wherein the at least one security control gap includes a lack of a second security control at a deployment location defined with respect to the at least one path of exploitation.

17. The system of claim 12, wherein the system is further configured to:

determine, for each security control of the set of security controls, a corresponding set of predetermined features to be used by the security control; and determine whether each security control of the set of security controls is configured to utilize each feature of the corresponding set of predetermined features, wherein the at least one security control gap includes a first security control of the set of security controls lacking configuration to perform at least one feature of the corresponding set of predetermined features.

18. The system of claim 12, wherein the system is further configured to:

analyze a pair of security controls from among the set of security controls, the pair of security controls including a first security control and a second security control of the set of security controls, wherein at least one first security control policy is applied to the first security control, wherein at least one second security control policy is applied to the second security control, wherein analyzing the pair of security controls further comprises analyzing the at least one first security control policy and the at least one second security control policy based on a set of predetermined security control policy conflicts;

identify at least one conflict between the at least one first security control policy and the at least one second security control policy based on the analysis, wherein the at least one security control gap includes the identified at least one conflict between the at least one first security control policy and the at least one second security control policy.

19. The system of claim 12, wherein the system is further configured to:

determine, for each security control of the set of security controls, a corresponding set of predetermined software components to be used by the security control, wherein each predetermined software component to be used by the security control has a corresponding version; and determine that a first security control of the set of security controls has an outdated version of at least one first software component of the set of predetermined software components, wherein the at least one security control gap includes the lack of the at least one first software component by the first security control.

20. The system of claim 12, wherein performing the at least one remediation action includes reconfiguring at least one security control of the set of security controls.

21. The system of claim 12, wherein the set of security controls is a set of first security controls, wherein performing the at least one remediation action includes deploying at least one second security control based on the identified at least one security control gap.

* * * * *